(12) United States Patent
Duan et al.

(10) Patent No.: US 8,073,818 B2
(45) Date of Patent: Dec. 6, 2011

(54) CO-LOCATION VISUAL PATTERN MINING FOR NEAR-DUPLICATE IMAGE RETRIEVAL

(75) Inventors: Manni Duan, Hefei (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 537 days.

(21) Appl. No.: 12/245,590

(22) Filed: Oct. 3, 2008

(65) Prior Publication Data

US 2010/0088295 A1    Apr. 8, 2010

(51) Int. Cl.
*G06F 17/00* (2006.01)
(52) U.S. Cl. ........ 707/687; 707/692; 707/723; 707/748; 707/749; 707/763
(58) Field of Classification Search .................. 707/706, 707/749, 687, 692, 723, 748, 763
See application file for complete search history.

(56) References Cited

U.S. PATENT DOCUMENTS

| | | | |
|---|---|---|---|
| 5,893,095 A * | 4/1999 | Jain et al. ............................... | 1/1 |
| 5,899,999 A * | 5/1999 | De Bonet ............................... | 1/1 |
| 6,415,282 B1 * | 7/2002 | Mukherjea et al. ............ | 707/737 |
| 6,624,821 B1 | 9/2003 | Shin et al. | |
| 6,763,148 B1 | 7/2004 | Sternberg et al. | |
| 7,035,467 B2 | 4/2006 | Nicponski | |
| 7,106,903 B2 | 9/2006 | Chang et al. | |
| 7,366,718 B1 * | 4/2008 | Pugh et al. ............................. | 1/1 |
| 7,539,657 B1 * | 5/2009 | Liu et al. ......................... | 706/45 |
| 7,644,090 B2 * | 1/2010 | Nakano et al. .............. | 707/999.1 |
| 7,734,627 B1 * | 6/2010 | Tong ............................. | 707/737 |
| 2004/0076345 A1 | 4/2004 | Olszak et al. | |
| 2005/0084154 A1 * | 4/2005 | Li et al. .......................... | 382/190 |
| 2005/0238209 A1 | 10/2005 | Ikeda et al. | |
| 2006/0050953 A1 | 3/2006 | Farmer et al. | |
| 2006/0257053 A1 | 11/2006 | Boudreau et al. | |
| 2007/0078846 A1 * | 4/2007 | Gulli et al. ......................... | 707/5 |
| 2008/0027917 A1 | 1/2008 | Mukherjee et al. | |
| 2008/0162474 A1 * | 7/2008 | Thong et al. ....................... | 707/6 |
| 2009/0208097 A1 * | 8/2009 | Husseini et al. ............... | 382/162 |
| 2009/0220166 A1 * | 9/2009 | Choi et al. ..................... | 382/260 |
| 2009/0234831 A1 * | 9/2009 | Ebadollahi et al. ............... | 707/5 |

OTHER PUBLICATIONS

Ahonen-Myka, et al., "Data Mining Meets Collocations Discovery", CSLI Studies in Computational Linguistics Online, 2005, pp. 194-203.
Celik, et al., "Zonal Co-Location Pattern Discovery with Dynamic Parameters", Seventh IEEE International Conference on Data Mining, 2007, pp. 433-438.
Chen, et al., "Similarity-Based Image Browsing", 2000, 8 pages.

(Continued)

*Primary Examiner* — Thanh-Ha Dang
(74) *Attorney, Agent, or Firm* — Joseph R. Kelly; Westman, Champlin & Kelly P.A.

(57) ABSTRACT

Described is a technology in which image near-duplicate retrieval is performed using similarities between patterns of query image words and patterns of database image words. In general, the image retrieval problems resulting from visual polysemy are reduced by using such visual patterns. Visual word vectors and visual pattern vectors are determined for the query image and a database image. These four vectors are used to determine similarity between the database image and the query image. The similarity scores may be used for ranking and/or re-ranking the database image similarity to the query image relative to other database images' similarity scores. Also described is expanding a query visual word of the query image to a set of visual words that are visual synonyms with the query visual word, to help reduce image retrieval problems resulting from visual synonymy.

17 Claims, 4 Drawing Sheets

OTHER PUBLICATIONS

Zhang, et al., "Detecting Image Near-Duplicate by Stochastic Attribute Relational Graph Matching with Learning", ACM Multimedia, 8 pages.

Csurka, et al., "Visual Categorization with Bags of Keypoints", 2004, 16 pages.

Fergus, et al., "Object Class Recognition by Unsupervised Scale-Invariant Learning", In CVPR, 2003, 8 pages.

Crandall, et al., "Spatial Priors for Part-Based Recognition Using Statistical Models", Proceedings of the 2005 IEEE Computer Society Conference on Computer Vision and Pattern Recognition (CVPR'05)—vol. 1, 2005, pp. 10-17.

Mikolajczyk, et al., "A Comparison of Affine Region Detectors", International Journal of Computer Vision, vol. 65, Issue 1-2, Nov. 2005, pp. 43-72.

Matas, et al., "Robust Wide-Baseline Stereo from Maximally Stable Extremal Regions", In British Machine Vision Conference, BMVC, 2002, pp. 384-393.

Bay, et al., "SURF: Speeded Up Robust Features", Proceedings of the ninth European Conference on Computer Vision, ECCV 2006, 14 pages.

Sivic, et al., "Video Data Mining Using Configurations of Viewpoint Invariant Regions", IEEE Computer Society Conference on Computer Vision and Pattern Recognition (CVPR'04)—vol. 1, 2004, pp. 488-495.

Quack, et al., "Video Mining with Frequent Itemset Configurations", CIVR 2006, pp. 1-10.

Huang, et al., "Discovery of Collocation Patterns: From Visual Words to Visual Phrases", Aug. 23, 2002, 29 pages.

Quack, et al., "Efficient Mining of Frequent and Distinctive Feature Configurations", IEEE 11th International Conference on Computer Vision, ICCV 2007, pp. 1-8.

Yuan, et al., "Discovering Co-Location Patterns from Spatial Datasets: A General Approach", IEEE, 2007, 8 pages.

David G. Lowe, "Distinctive Image Features from Scale-Invariant Keypoints", Accepted for publication in the International Journal of Computer Vision, Jan. 5, 2004, pp. 1-28.

Yang, et al., "Evaluating Bag-of-Visual-Words Representations in Scene Classification", Proceedings of the international workshop on Workshop on multimedia information retrieval, 2007, pp. 197-206.

Sivic, et al., "Video Google: A Text Retrieval Approach to Object Matching in Videos", Proceedings of the Ninth IEEE International Conference on Computer Vision (ICCV 2003) 2-Volume Set, 2003, pp. 1-8.

Yang, et al., "A Text Categorization Approach to Video Scene Classification Using Keypoint Features", Oct. 3, 2006, pp. 1-25.

Philbin, et al., "Object Retrieval with Large Vocabularies and Fast Spatial Matching", Proceedings of the IEEE Conference on Computer Vision and Pattern Recognition (CVPR) 2007, 8 pages.

"Zurich Building Image Database", http://www.vision.ee.ethz.ch/showroom/zubud/index.en.html, May 27, 2008.

Shao, et al., "Fast Indexing for Image Retrieval Based on Local Appearance with Re-Ranking", International Conference on Image Processing, vol. 3, Issue, 2003, pp. 14-17.

Agrawal, et al., "Mining Association Rules between Sets of Items in Large Database", Proceedings of the 1993 ACM SIGMOD Conference, May 1993, pp. 1-10.

Nister, et al., "Scalable Recognition with a Vocabulary Tree", Conference on Computer Vision and Pattern Recognition, 2006 IEEE Computer Society, vol. 2, pp. 2161-2168.

Mitra, et al., "An Analysis of Statistical and Syntactic Phrases", Metadata Version 1, 1997, pp. 1-11.

Han, et al., "Frequent Pattern Mining: Current Status and Future Directions", Springer, Data Min Knowl Disc (2007), Jan. 27, 2007, pp. 55-86.

Salton, et al., "A Vector Space Model for Automatic Indexing", Communications of the ACM, vol. 18, No. 11, Nov. 1975, pp. 613-620.

Yasuhiko Morimoto, "Mining Frequent Neighboring Class Sets in Spatial Databases", Proceedings of the seventh ACM SIGKDD international conference on Knowledge discovery and data mining, 2001, pp. 353-358.

* cited by examiner

CO-LOCATION VISUAL PATTERN MINING FOR NEAR-DUPLICATE IMAGE RETRIEVAL

BACKGROUND

In general, Image Near-Duplicate (IND) refers to a pair of images that are close to being exact duplicates of one another, such as two images of the same object or location that differ only slightly due to changed capturing conditions, times, rendering conditions, and/or editing operations, and so forth. Detection or retrieval of IND is very useful in a variety of real-world applications. For example, IND can improve traditional tag-based image searches by filtering out duplicate images returned by search engine; IND can be used as a way of building bridges between two web pages in different languages; IND can provide similarity clues for recognizing visual events and searching news video clips.

Image Near-duplicate (IND) retrieval thus aims at finding images which are duplicates or near duplicate to another (e.g., query) image. One of the most popular and practical methods toward IND retrieval is based on Bag-of-Words (BoW) model which assumes that image retrieval is analogous to document retrieval. The general idea behind BoW methods is that local regions of images are characterized using high-dimensional descriptors, which are then mapped to "visual words" selected from a visual vocabulary.

However, the BoW approach is problematic in that visual words are poor in their ability to express regions relative to text words. As image retrieval is a growing in importance, including with respect to image-based querying, any improvements in image retrieval are beneficial.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which image near-duplicate retrieval is performed based at least in part on similarities between patterns of query image words and patterns of database image words. In general, the problems resulting from visual polysemy are reduced by using such visual patterns.

Upon receiving a query image, a visual word vector and visual pattern vector is determined for the query image. The vectors are used with like vectors of database images to determine a similarity score indicative of the similarity between each database image and the query image.

In one aspect, the similarity scores may be used for ranking and/or re-ranking the database images according to various ranking usage models. The scores for pattern and word vector comparisons may be combined, or the pattern and word vector of a database image may be merged with each other before comparison with like-merged vectors of the query image.

In one aspect, a query visual word of the query image is expanded to a set of visual words that are visual synonyms with the query visual word. This reduces problems resulting from visual synonymy.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards improving the expressional ability of visual words. In one aspect, this is accomplished by likening visual word expression aspects to visual "synonymy" and "polysemy." Visual synonymy is used herein in a very general sense to describe the fact that there are many different visual words that refer to the same physical meaning. Visual polysemy refers to the fact that most visual words have more than one distinct physical meaning.

By way of example of how visual words have poor expressional ability compared to text words, consider that a concrete object is named with a text word or phrase. However, this cannot apply to visual words because one visual word can represent many different concrete objects when combined with different visual words. At the same time, several different visual words can represent the exact same object. This poor expressional ability issue hampers the performance of image near-duplicate retrieval.

It should be understood that any of the examples herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and image retrieval in general.

Figure 1:
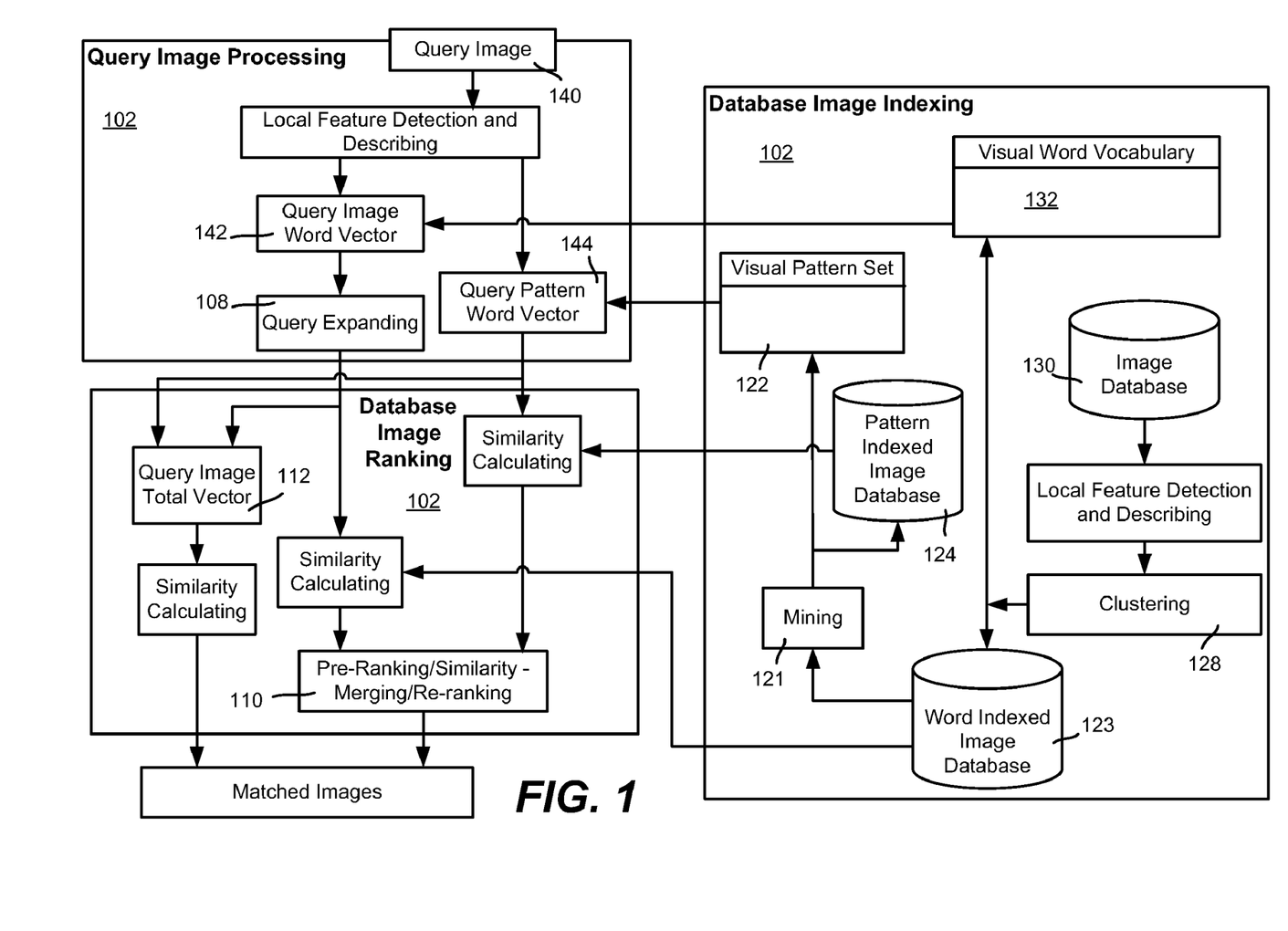
FIG. 1 is a block diagram showing an example image near-duplicate retrieval system that uses patterns and pattern vectors in determining images that are similar to a query.

Turning to FIG. 1, there is shown an image retrieval system/framework that includes a query image processing subsystem 102, a database image indexing subsystem 104, and a database image ranking subsystem 106. As described below, the framework includes various components for reducing problems caused by visual synonymy, based upon an extended similarity function that implicitly extends query visual words, and for reducing the problems of visual polysemy based on visual patterns. Further, a modified Apriori algorithm is provided to mine quantitative patterns that have a definition of patterns containing duplicate items. The various components of the framework are described below.

As mentioned above, there are usually many visual words that can represent a same visual meaning, which is referred to as visual synonymy, with corresponding visual words referred to as visual synonyms. The prevalence of visual synonymy tends to decrease the recall performance of image retrieval systems.

To eliminate the effects of visual synonymy, the image retrieval mechanism described herein provides a new image similarity function, which implicitly extends a query visual word to a set of visual words which are visual synonyms with the query visual word. In general, this extended similarity function is referred to as a query expansion technique (block 108).

As also mentioned above, many visual words have multiple visual meanings, referred to herein as visual polysemy, with the corresponding visual words referred to as visual polysemies. Visual polysemy is one factor underlying the relatively poor precision of existing IND retrieval systems.

To eliminate the effects of visual polysemy, a visual pattern (which refers to a meaningful adjacent visual word set) is used in BoW model. In general, using adjacent visual word sets helps disambiguate a visual word which has multiple meanings. Aspects of visual patterns are how to find a visual pattern, and how to use a visual pattern. For finding a visual pattern, a known Apriori algorithm (which is capable of discovering visual patterns comprising different visual words) is modified so as to mine a quantitative pattern, which is defined as visual patterns containing duplicate items (e.g., $\{w_a, w_a\}$).

For using a visual pattern, various usage models 110 are set forth herein. One usage model is pre-ranking, which refers to ranking database images according to their similarity scores based on their visual pattern vector, and the re-ranking the top K database images found in this way according to their similarity scores as computed by their visual word vectors.

Re-ranking refers to locating images in the opposite order, e.g., by first ranking according to similarity scores as computed based upon their visual word vectors, selecting the top K images based on the visual word vector ranking, and then re-ranking the top K images according to their similarity scores computed based upon their visual pattern vectors.

Similarity-Merging refers to computing overall similarity score, e.g., obtained by adding a similarity score based upon the visual word vector to a similarity score of based upon the visual pattern vector. Note that adding is only one such way of mathematically combining such scores, and further, that the types of scores may be weighted differently in computing the merged result.

Vector-Merging is another usage model, in which the visual word vector and the pattern vector are merged into one overall vector first. Then, a similarity score is determined from the overall vector 112.

In the BoW model, two descriptors are assumed to be identical only if they are assigned to the same cluster (a visual word). Conversely, two descriptors are not matched if they are assigned to different clusters (visual words), because visual words are assumed to be independent in the BoW model. Practical quantization methods such as K-means and HKM cannot grantee that the descriptors can be assigned to the same cluster (visual word) with their nearest descriptors.

Figure 2:
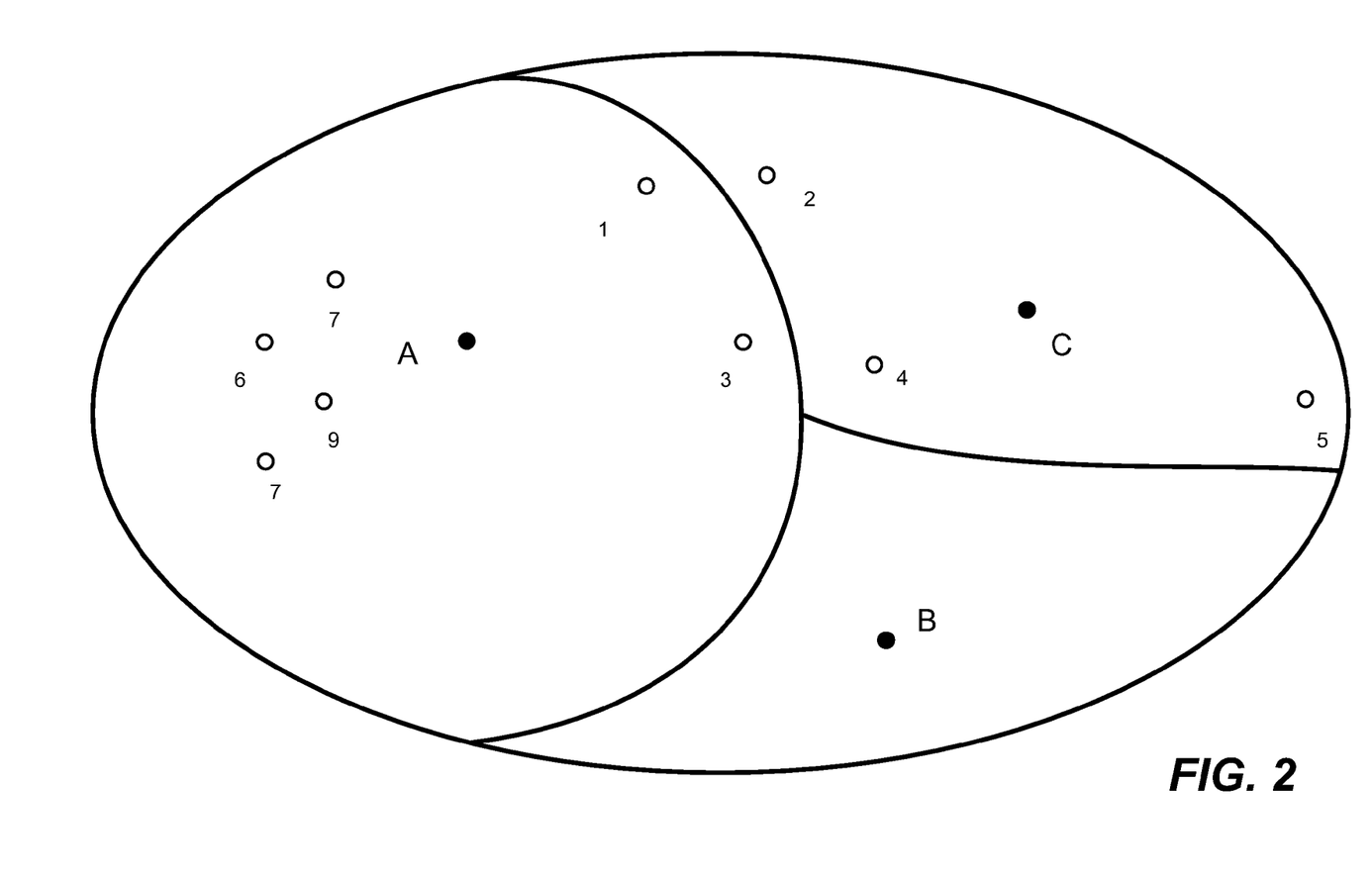
FIG. 2 is a representation of clustering and matching descriptor couples.

FIG. 2 shows a simplified example of descriptors and visual words. Points A, B and C are three visual words (cluster centers), and points 1 through 9 are descriptors. Two descriptors are a "matching descriptor couple" if they are each the nearest neighbor to one another. For example, in FIG. 2, descriptor 1 and descriptor 2 comprise a matching descriptor couple, as do descriptor 3 and descriptor 4. However, in the BoW model, because these matching descriptor couples are assigned to different visual words, they are not matched in conventional IND retrieval.

In many situations, a large percentage of matching descriptor couples are clustered to two different visual words. These matching descriptor couples are no longer correlated in BoW model processes, that is, these matching descriptor couples are lost during quantization, and are thus referred to herein as lost descriptor couples. Further, lost descriptor couples often describe corresponding physical parts of two very close (nearly duplicate scenes), but are not clustered to the same visual word.

A possible potential method to maintain descriptor couples' correlation is to estimate the interrelation between visual words and re-correlate the lost descriptor couples by correlating the visual words to which they belong. Current BoW methods often assume that visual words are independent and are not related when computing image similarities. Assume $A=\{w_A^1, w_A^2, \ldots, w_A^N\}$ and $B=\{w_B^1, w_B^2, \ldots, w_B^N\}$ are two vectors of visual words, usually they are TF-IDF (term frequency-inverse document frequency) vectors of the images for image retrieval. The cosine similarity is represented using a dot product:

$$sim(\vec{A}, \vec{B}) = \cos(\vec{A}, \vec{B}) = \frac{\vec{A} \cdot \vec{B}}{\sqrt{\vec{A} \cdot \vec{A}} \sqrt{\vec{B} \cdot \vec{B}}} \quad (1)$$

$$\vec{A} \cdot \vec{B} = \sum_{i,j} w_A^i w_B^j s(i, j). \quad (2)$$

Under the assumption of independence between visual words, the similarity kernel $s(i, j)$ is reduced to the Kronecker delta function which means one visual word is only related to itself:

$$s(i, j) = \delta(i, j) = \begin{cases} 1, i = j \\ 0, i \neq j \end{cases} \quad (3)$$

However, as described above, many matched descriptor couples are assigned to different visual words and therefore those visual words are actually dependent. Instead of the original identity matrix, there is provided a diagonal matrix to present the interrelation of visual words, referred to herein as a correlation matrix:

$$s(i,j)=M(i,j). \quad (4)$$

$M(i, j)$ indicates the percentage of matched descriptor couples that are shared between visual word i and visual word j. In other words, when the cluster of visual word i contains $N_i$ descriptors and the cluster of visual word j contains $N_j$ descriptors, N out of the $N_i$ descriptors in visual word i are matched descriptor couples with descriptors in the cluster of visual word j, $M(i, j)$ is computed as:

$$M(i,j)=\min(N/N_i, N/N_j) \quad (5)$$

Returning to FIG. 2 as an example, $M(A,B)=\min(2/6, 2/3)=1/3$ and $M(A,A)=\min(4/6,4/6)=2/3$.

A precise estimation of the correlation matrix is achieved by traversing the entire descriptor space to find nearest neighbor for each descriptor, which actually has the complexity of $O((DN)^2)$ (assuming there are D images and each has N descriptors on average). To reduce the complexity, an approximation is used in one approach. More particularly, the dataset is divided into F subsets, each with D/F images on average. A traversal search for matching descriptor couples is executed in the descriptor space of these subsets. The complexity is reduced to $O((DN)^2/F)$.

Turning to reducing visual polysemy, as with visual synonymy, visual polysemy results from improper quantization. In general, the cluster of a visual word may contain several to several hundred descriptors. Unbalanced distributed feature space, inappropriate clustering parameters, and so forth result in descriptors that represent totally different physical meanings being clustered to the same visual word.

Often, descriptors that are clustered to the same visual word are significantly different in their physical meanings. As a result, regarding such descriptors as one identical visual word reduces the precision of IND retrieval.

To deal with the visual polysemy problem, visual patterns are evaluated, which are defined as a meaningful adjacent word set. The use of visual patterns in the IND retrieval system describe herein is based upon determining which visual word sets are visual patterns, determining whether a visual pattern exists in an image, determining how visual patterns may be treated in a vector space model, a determining appropriate weighting for visual patterns; standard TF-IDF techniques may be used for the weighing determination.

For determining which visual word sets are visual patterns, a modified Apriori algorithm is used to mine visual patterns from visual word vocabulary. Because a visual word may occur multiple times in an adjacent area the modified Apriori algorithm also mines a quantitative pattern, which is defined as pattern containing duplicate visual words, e.g., {Wa, Wa}.

In one aspect, there are two mechanisms to determine whether the referencing visual pattern occurs in the image, namely a hard decision mechanism and/or a soft decision mechanism. For the hard decision mechanism, a visual pattern is considered as occurring only when all of the single visual words in it occur in a same adjacent area. The soft decision mechanism is based upon measuring the possibility that a visual pattern has occurred in the image by computing how many of the visual words in it has occurred in this adjacent area. For example, assume $\{w_A, w_B\}$ and $\{w_C, w_D\}$ are two visual patterns. Visual words in one adjacent area are $\{w_A, w_B, w_C, w_E, w_F\}$. In hard decision way, pattern $\{w_A, w_B\}$ occurs one time in this area while $\{w_C, w_D\}$ occurs zero time in this area. However, in soft decision way, pattern $\{w_A, w_B\}$ occurs one time in this area and $\{w_C, w_D\}$ occurs 0.5 times because one of the two visual words in pattern $\{w_C, w_D\}$, occurs in this area. The hard decision mechanism is described hereinafter.

Turning to visual pattern mining (blocks/data stores 121-124), transactions are defined over space so that an Apriori-like algorithm can be used. The frequent item sets that are mined from a transaction database are the visual patterns.

Before mining the patterns, a transaction for image features is defined by a reference-feature centric method. In this method, transactions are created around one specified feature. K-nearest neighborhood is chosen herein:

Let $I=\{w_1, w_2, \ldots, w_k\}$ be a set of visual words. Transaction database $D=\{T_1, T_2, \ldots, T_n\}$ is a set of n transactions with unique identifiers, where $T_i$ is one transaction. Each item in $T_i$ is a descriptor being clustered to a certain visual word in I and therefore, can be regard as one instance of this certain visual word. Pattern mining method aims to mine frequently co-occurring visual word subsets from transaction database D.

The support of a word set $A \subseteq I$ is defined as $$\text{support}(A) = \frac{|\{T \in D \mid A \subseteq T\}|}{|D|}$$

to describe one set's occurrence frequency. A is called frequent if support $(A) \geq s$ where s is a threshold defined by user.

Another measurement of a set is described as the confidence of a word set:

$$\text{Confidence } (A \to B) = \frac{\text{support }(A \cup B)}{\text{support }(A)} = \frac{|\{T \in D \mid (A \cup B) \subseteq T\}|}{|\{T \in D \mid A \subseteq T\}|} \quad (6)$$

where A and B are two visual word sets. The confidence can be seen as a maximum likelihood estimation of the conditional probability that B is true given that A is true.

Also defined are Association Hyperedges (AH) of a item set $A=\{w_1, w_2, \ldots w_N\}$ to give an average estimation of the confidence between words in the set:

$$AH(A) = \frac{1}{N} \sum_{i=1}^{N} \text{confidence}(A - \{w_i\} \to w_i) \quad (7)$$

The Association Hyperedges are regarded as a measurement to rank patterns for it can measure how often a set of words co-occur in general. The K largest AH pattern word sets compose visual pattern list in one implemented system.

Turning to quantitative pattern mining, the original (unmodified) Apriori algorithm can be conceptually viewed as a question of finding associations between "1" values in a relational table where all the attributes are Boolean. The relational table has an attribute corresponding to each visual word and a record corresponding to each transaction. The value of an attribute is "1" if the corresponding visual word is presented in the transaction, or "0" if not. More particularly, the original Apriori algorithm cares about how often different visual words co-occur and ignores those co-occurred visual words with the same indexes.

However, a large portion of transactions contain visual words with same indexes. Mining the quantitative patterns provides benefits with respect to improved retrieval.

In general, to mine quantitative visual patterns, the transactions are preprocessed so that duplicated visual words in one transaction are distinguishable by the Apriori algorithm. Algorithm 1 shows preprocessing of the input transactions. The indexes of duplicated visual words are changed using an encoding rule. For example, $\{w_a, w_a, w_b, w_a\}$ is encoded as $\{w_a, w_{a2}, w_b, w_{a3}\}$ after preprocessing. Note that the "order" of a visual word in our algorithm corresponds to the order of appearance of the visual word among visual words of the same index. Thus the orders of the first, second and third "$w_a$" in the transaction $\{w_a, w_{a2}, w_b, w_{a3}\}$ are 1, 2 and 3, respectively.

---

Algorithm 1: Visual Word ID pre-processing 1. for (i ← 1; i ≦ MAXWORD; i + +)// All the ID of visual words in the transactions are integers ranging from 1 to MAXWORD
2.     count[i] ← 0; // count[i] counts the appearance of word "i" in one transaction
3. for all transactions t ∈ D
4.     for( i ← 1;i ≦ sizeof(t);i + +)
5.         wi ← t.item[i];
6.         count[wi] ← count[wi] + 1;
7.         order ← count[wi];
8.         wi ← wi + (order × MAXWORD; // encode wi
9.     for all words w ∈ t
10.        do count[w] ← 0; // clear count[ ] for the next transaction

---

The preprocessed transactions are then used as the input of the Apriori algorithm to generate frequent visual patterns. A simple post-processing step inverse to the preprocessing step can decode the visual patterns from ones like $\{w_a, w_{a2}\}$ to {$w_a$, $w_a$} as desired. For those duplicate visual words, their repeating time equals their highest order. For example, {$w_a$, $w_{a3}$} is decoded as {$w_a$, $w_a$, $w_a$} and {$w_b$, $w_{a2}$} is decoded as {$w_b$, $w_a$, $w_a$}.

The visual patterns are then ranked according to their AH. The top K visual patterns provide the visual pattern vocabulary.

Visual pattern counting counts the occurrence number of a visual pattern in an image. Assume A is one image, $\vec{A}_w$ and $\vec{A}_p$ is a visual word vector and visual pattern vector of image A, respectively, and transactions belonging to A are {$T_1$, $T_2, \ldots, T_k$}. The $i^{th}$ dimension of $\vec{A}_p$ plus one when all visual words belonging to the $i^{th}$ visual pattern appear in one transaction. If a visual word has already been counted as a part of a visual pattern, it no longer contributes to the corresponding dimension of the visual word vector. This approach follows the hard decision mechanism.

Visual pattern usage models provide various ways to use visual patterns in vector space model. Four such approaches are described herein, three of which are represented in FIG. 1 by block 110, namely pre-ranking, re-ranking, and score-merging.

For score-merging, database images are ranked by their overall similarities, which in one implementation is the sum of their similarities computed by the visual pattern vector and the similarities computed by visual word vectors. Assume A and B are two images, $\vec{A}_w$ and $\vec{A}_p$ are image A's visual word vector and visual pattern vector while $\vec{B}_w$ and $\vec{B}_p$ are those for image B. The overall similarity between image A and image B may be determined as follows:

$$sim(\vec{A}, \vec{B}) = sim_W(\vec{A}_w, \vec{B}_w) + \alpha * sim_P(\vec{A}_p, \vec{B}_p) \qquad (8)$$

$$= \cos(\vec{A}_w, \vec{B}_w) + \alpha * \cos(\vec{A}_p, \vec{B}_p) \qquad (9)$$

$$= \frac{\vec{A}_w \cdot \vec{B}_w}{\sqrt{\vec{A}_w \cdot \vec{A}_w} \sqrt{\vec{B}_w \cdot \vec{B}_w}} + \alpha * \frac{\vec{A}_p \cdot \vec{B}_p}{\sqrt{\vec{A}_p \cdot \vec{A}_p} \sqrt{\vec{B}_p \cdot \vec{B}_p}} \qquad (10)$$

$$\vec{A}_w \cdot \vec{B}_w = \sum_{i,j} tw_A^i tw_B^j s(i,j) \text{ and } \vec{A}_p \cdot \vec{B}_p = \sum_{i,j} tp_A^i tp_B^j s(i,j) \qquad (11)$$

where $tw_A^i$ is the tf-idf weight of the $i^{th}$ visual word in image A and $tp_A^i$ is the tf-idf weight of the $i^{th}$ visual pattern in image A.

$$tw_A^i = tfw_A^i * idfw_A^i \qquad (12)$$

$$= \frac{\|\text{visual word } i \text{ in image } A\|}{\|\text{all visual words in image } A\|} * \log \frac{\|\text{all images}\|}{\|\text{images contain visual word } i\|} \qquad (13)$$

$$tp_A^i = tfp_A^i * idfp_A^i \qquad (14)$$

$$= \frac{\|\text{visual pattern } i \text{ in image } A\|}{\|\text{all visual patterns in image } A\|} * \log \frac{\|\text{all images}\|}{\|\text{images contain visual pattern } i\|} \qquad (15)$$

Note that $\alpha$ is an adjustable parameter which can be used to change a visual pattern's significance in the IND retrieval. Experimentally, $\alpha$ should be set to less than 1.

Another usage model is vector-merging, in which the overall visual feature vectors, which are actually the strings of visual word vectors and visual pattern vectors, are combined to compute similarities and rank database images. Taking image A as an example, visual word vector $\vec{A}_w=\{w_1, w_2, \ldots, w_N\}$ and visual pattern vector $\vec{A}_p=\{p_1, p_2, \ldots, p_M\}$ will be merged into one overall visual feature vector $\vec{A}=\{w_1, w_2, \ldots, w_N, p_1, p_2, \ldots, p_M\}$. An image's similarities with a query image may be measured by the overall visual feature vectors as follows:

$$sim(\vec{A}, \vec{B}) = \cos(\vec{A}, \vec{B}) = \frac{\vec{A} \cdot \vec{B}}{\sqrt{\vec{A} \cdot \vec{A}} \sqrt{\vec{B} \cdot \vec{B}}} \qquad (16)$$

$$\vec{A} \cdot \vec{B} = \sum_{i=1}^{N+M} \sum_{j=1}^{N+M} t_A^i t_B^j s(i,j) \qquad (17)$$

where $t_A^i$ is the tf-idf weight of the $i^{th}$ visual feature (visual word or visual pattern) and:

$$t_A^i = tf_A^i * idf_A^i = \frac{\|\text{visual feature } i \text{ in image } A\|}{\|\text{all visual features in image } A\|} * \log \frac{\|\text{all images}\|}{\|\text{images contain visual feature } i\|} \qquad (18)$$

A difference between score-merging and vector-Merging method lies in the assumption about whether visual patterns are related to visual words. In score-merging, visual patterns are assumed to be independent with visual words for they have independent weights and unrelated vector space. In vector-merging, visual patterns are regarded as special visual words and weighted together with visual words.

Thus, to summarize, a visual word vocabulary is obtained by clustering (block 128) detected local descriptors in database images 130, e.g., via a known DoG detector and SIFT descriptor; SIFT descriptors are quantized using hierarchical K-means clustering. The descriptors in the database are assigned to the nearest cluster center. In this way, a visual word vocabulary 132 is constructed. According to the visual word vocabulary 132, the images in databases are represented as vectors of visual words.

Based on the visual word vocabulary, the modified Apriori algorithm is used to discover frequent visual patterns. Similarly, the set of frequent visual patterns is defined as a visual pattern vocabulary. The above-described hard decision mechanism may be utilized to count the occurrence of visual patterns in each image.

When a query image 140 enters the system, a visual word vector 142 and visual pattern vector 144 for it are obtained, e.g., in the same local feature detection and describing way as for the database images. This is shown via steps 302, 304 and 306 of FIG. 3.

Figure 3:
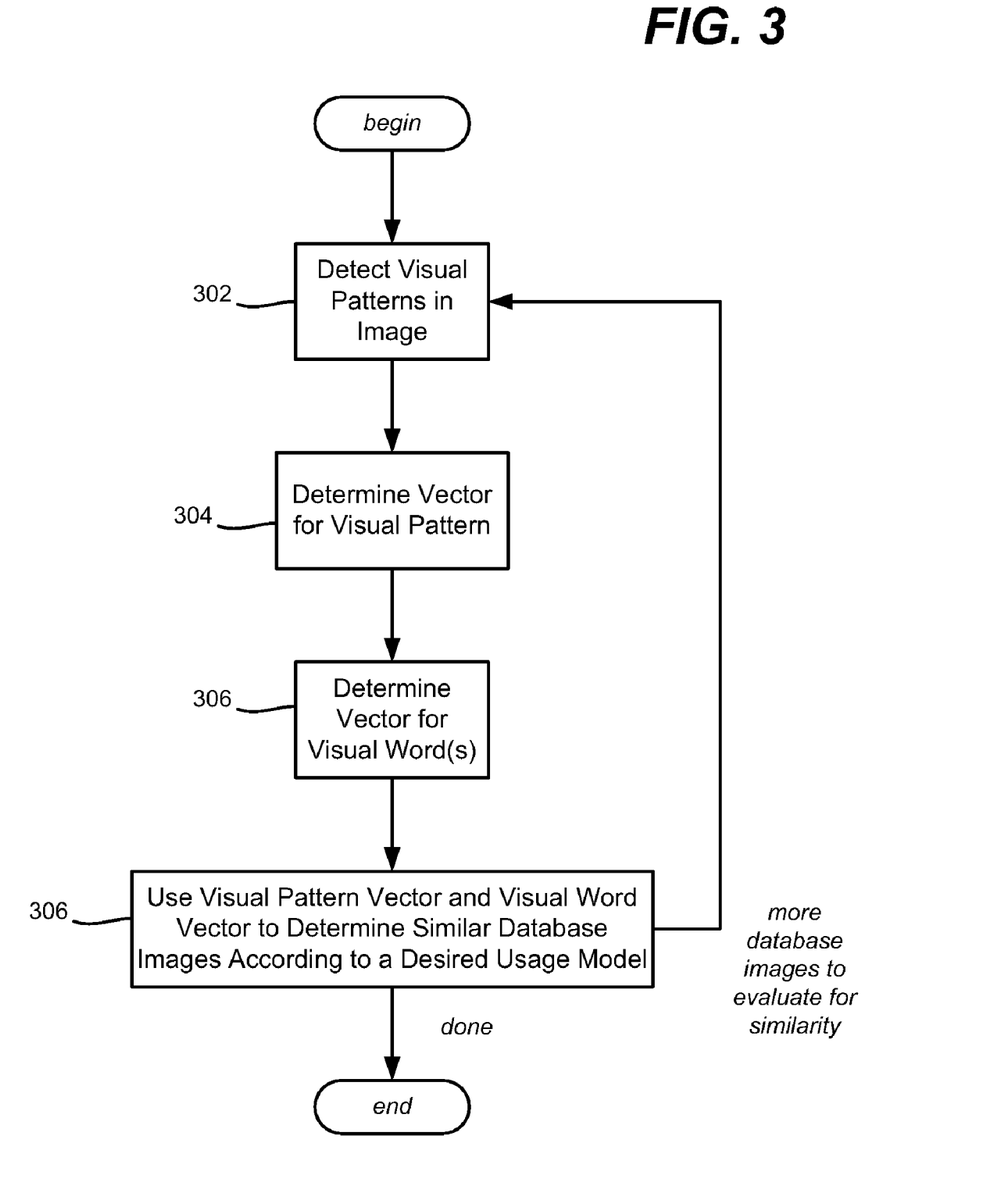
FIG. 3 is a flow diagram showing example steps of an image near-duplicate retrieval system that uses patterns and pattern vectors in determining images that are similar to a query.

Database images are then ranked according to their similarities with a query image 140 according to one of the desired usage models (step 306). In one implementation, similarities are simply the cosine distance between visual word vectors of query image and database images. However, an extended similarity function (in block 108) may be used to expand the query image's visual word vector 142 before computing the cosine distance of the visual word vectors for comparison.

Exemplary Operating Environment

Figure 4:
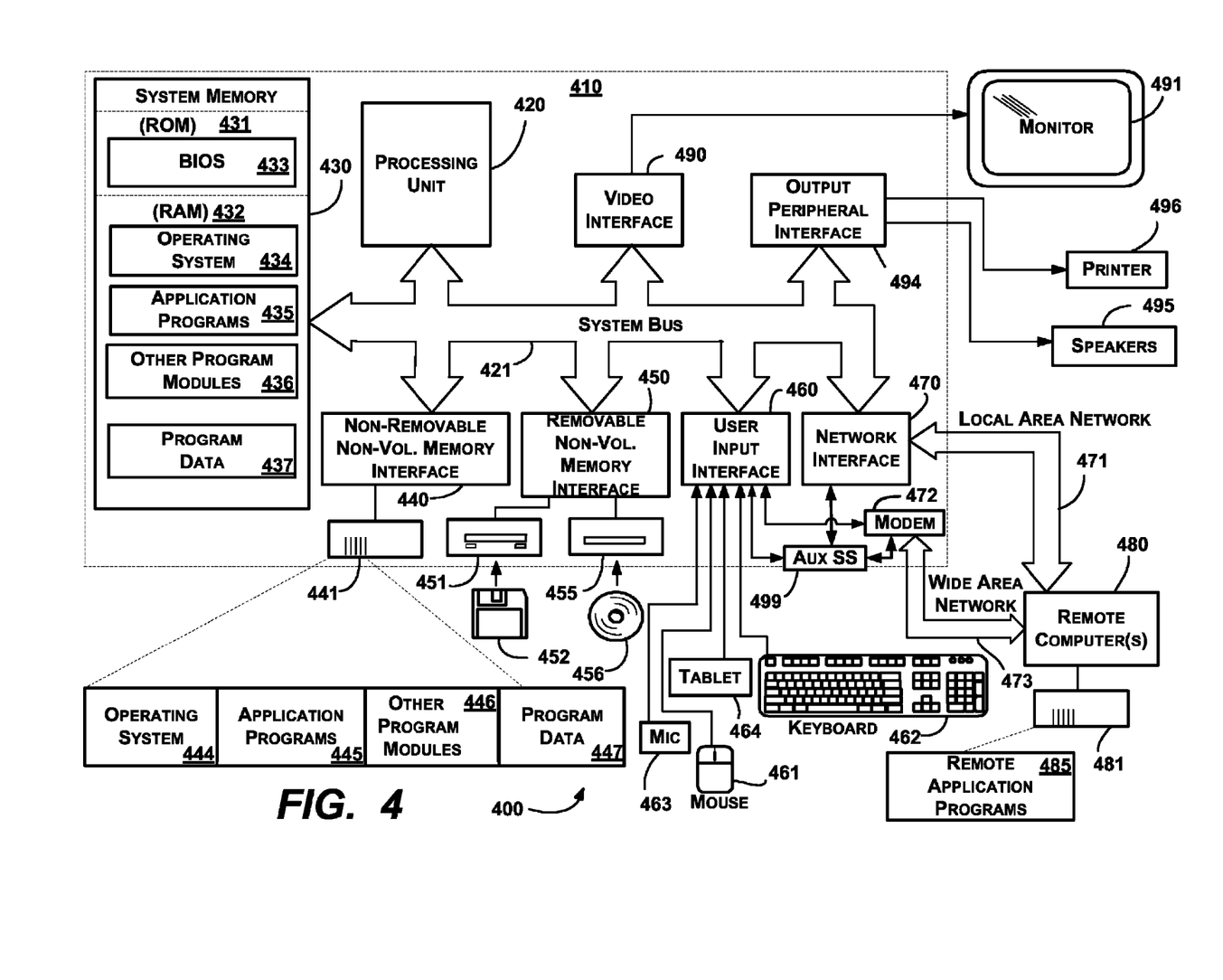
FIG. 4 shows an illustrative example of a computing environment into which various aspects of the present invention may be incorporated.

FIG. 4 illustrates an example of a suitable computing and networking environment 400 on which the examples of FIGS. 1-4 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented method comprising:
performing near-duplicate image retrieval with a computer processor, including detecting, with the computer processor, visual patterns in images, representing the visual patterns as visual pattern vectors, and using the visual pattern vectors and visual word vectors to determine, with the computer processor, similarity between images by ranking database images according to a similarity of each given database image with a query image, including by obtaining a query visual pattern vector for the query image, and for each given image, determining a visual pattern vector and computing a visual pattern-based similarity score for the given image by selecting a set of most similar database images based on a ranking of the database images according to the visual pattern-based similarity scores, and re-ranking the set of most similar database images by evaluating similarity for each specific image in the set of most similar database images via a visual word vector corresponding to the specific image and a query visual word vector corresponding to the query image.

2. The computer-implemented method of claim 1 further comprising, reducing visual synonymy effects in the near-duplicate image retrieval by extending a query visual word to a set of visual words that are visual synonyms with the query visual word.

3. The computer-implemented method of claim 1 wherein using the visual pattern vectors and visual word vectors to determine similarity between images comprises, ranking database images according to similarity of each database image with a query image, including by obtaining the query visual word vector for the query image, and for each given database image, determining a visual word vector and computing a visual word-based similarity score by evaluating similarity via the visual word vector for the given database image and the query visual word vector.

4. The computer-implemented method of claim 3 wherein using the visual pattern vectors and visual word vectors to determine similarity between images further comprises, selecting a set of most similar database images based on a ranking of the database images according to the visual word-based similarity scores, and re-ranking the set of most similar database images by evaluating similarity for each specified image via a visual pattern vector corresponding to the specified image and a query visual pattern vector corresponding to the query image.

5. The computer-implemented method of claim 1 further comprising, ranking images according to similarity scores computed based upon visual word vectors corresponding to the images, and re-ranking at least some of the visual word vector-ranked database images by computing similarity scores based upon visual pattern vectors corresponding to the images.

6. The computer-implemented method of claim 1 wherein performing the near-duplicate image retrieval comprises, ranking images by computing combined similarity scores between pairs of images, including, for each pair of images, combining a similarity score computed from visual word vectors of the images with a similarity score computed from visual word vectors of the images.

7. The computer-implemented method of claim 1 wherein performing the near-duplicate image retrieval comprises merging a visual word vector with a visual pattern vector for a first image into a first merged vector, merging a visual word vector with a visual pattern vector for a second image into a second merged vector, and determining a similarity score from the first merged vector and the second merged vector.

8. The computer-implemented method of claim 1 further comprising, mining quantitative patterns from database images, including images in which the patterns contain duplicate items.

9. In a computing environment, a system comprising:
a query image processing subsystem that determines a query image word vector for the query image and a query pattern word vector for the query image, and a database image ranking subsystem that ranks database images with respect to similarity of each database image to the query image, including obtaining an image word vector and a pattern word vector for each database image, and, for each database image, using the query image word vector for the query image, the query pattern word vector for the query image, the image word vector for the database image, and the pattern word vector for the database image to determine a score for the similarity of each database image to the query image wherein the database image ranking subsystem uses the query image word vector for the query image, the query pattern word vector for the query image, the image word vector for the database image, and the pattern word vector for the database image to determine a score of the similarity of the database image to the query image by ranking database images according to a similarity score, for each image with the query image via visual word vector-based scoring, selecting a set of most similar images based on the ranking according to the visual word vector-based scoring, and re-ranking the set according to the similarity of each image pattern vector-based similarity score with respect to the query pattern word vector; and
the system further comprising a computer processor being a functional component of the system and activated by the query image processing system and database image ranking system to facilitate determining the query image word vector and query pattern word vector and ranking the database images.

10. The system of claim 9 wherein the query image processing subsystem includes a query expanding mechanism that extends a query visual word of the query image to a set of visual words that are visual synonyms with the query visual word, for use in determining similarity with the database images.

11. The system of claim 9 wherein the database image ranking subsystem uses the query image word vector for the query image, the query pattern word vector for the query image, the image word vector for the database image, and the pattern word vector for the database image to determine a score for the similarity of each database image to the query image by ranking database images according to a similarity score, for each image with the query image via visual pattern vector-based scoring, selecting a set of most similar images based on the ranking according to the visual pattern vector-based scoring, and re-ranking the set according to the word vector-based similarity score for each image with respect to the query image word vector.

12. The system of claim 9 wherein the database image ranking subsystem uses the query image word vector for the query image, the query pattern word vector for a given query image, the image word vector for the given database image, and the pattern word vector for the database image to determine a score for the similarity of the given database image to the query image by adding a word-based similarity score based upon the image word vector of an image and the query image word vector to a pattern-based similarity score based upon the pattern word vector of the image and the query pattern word vector to determine an overall similarity score.

13. The system of claim 9 wherein the database image ranking subsystem uses the query image word vector for the query image, the query pattern word vector for the query image, the image word vector for a given database image, and the pattern word vector for the given database image to determine a score for similarity of the given database image to the query image by merging the image word vector and pattern word vector of an image into a first merged vector, merging the query image word vector and with the query pattern word vector into a second merged vector, and determining a similarity score based on similarity between the first merged vector and the second merged vector.

14. The system of claim 9 further comprising a database image indexing subsystem that determines visual pattern vectors and visual word vectors for the database images.

15. One or more computer storage media having computer-executable instructions, the computer storage media being a hardware storage media, the instructions, when executed, perform steps, comprising:
receiving a query image;
determining a visual word vector for the query image;
determining a visual pattern vector for the query image;
determining similarity with each image of a set of database images, including, for each image of the set of database images, computing a first similarity score by evaluating the visual word vector for the query image with a visual word vector for each database image and computing a second similarity score by evaluating the visual pattern vector for the query image with a visual pattern vector for each database image; and
using the first and second similarity scores according to a usage model by ranking the set of database images based on one of the first and second similarity scores, and re-ranking a selected set of highest ranked database images in the set of database images based on another of the first and second similarity score.

16. The one or more computer storage media of claim 15 wherein using the first and second similarity scores according to the usage model comprises ranking database images based on the first and second similarity scores according to a pre-ranking usage model, according to a re-ranking usage model, according to a similarity merging usage model, or according to a vector merging usage model.

17. The one or more computer storage media of claim 15 having further computer-executable instructions comprising, expanding a query visual word of the query image to a set of visual words that are visual synonyms with the query visual word.

* * * * *